United States Patent
Howard

(10) Patent No.: US 7,302,129 B2
(45) Date of Patent: Nov. 27, 2007

(54) OPTICAL TRANSISTOR WITH SUB-WAVELENGTH APERTURE

(75) Inventor: Robert J. Howard, Clifton, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 53 days.

(21) Appl. No.: 10/962,225

(22) Filed: Oct. 12, 2004

(65) Prior Publication Data

US 2006/0078249 A1  Apr. 13, 2006

(51) Int. Cl.
*G02B 6/35* (2006.01)
(52) U.S. Cl. ........................................ 385/16
(58) Field of Classification Search .................. None
See application file for complete search history.

(56) References Cited

U.S. PATENT DOCUMENTS

| | | | |
|---|---|---|---|
| 5,973,316 A | 10/1999 | Ebbesen et al. |
| 6,040,936 A | 3/2000 | Kim et al. |
| 6,052,238 A | 4/2000 | Ebbesen et al. |
| 6,282,005 B1 | 8/2001 | Thompson et al. |
| 6,285,020 B1 | 9/2001 | Kim et al. |
| 6,404,970 B1 | 6/2002 | Gransden et al. |
| 6,441,298 B1 | 8/2002 | Thio |
| 6,501,783 B1 | 12/2002 | Capasso et al. |
| 2002/0036828 A1 | 3/2002 | Wong |

*Primary Examiner*—Sarah Song
(74) *Attorney, Agent, or Firm*—Mark A. Wurm

(57) ABSTRACT

An optical switch has a conductor and one or more sub-wavelength apertures. The switch is activated and periodic perturbations are dynamically formed in proximity to the conductor. Photons are directed toward and impinge upon the switch, and a greater amount of light propagates through the sub-wavelength apertures in the activated switch as compared to an unactivated switch.

40 Claims, 7 Drawing Sheets

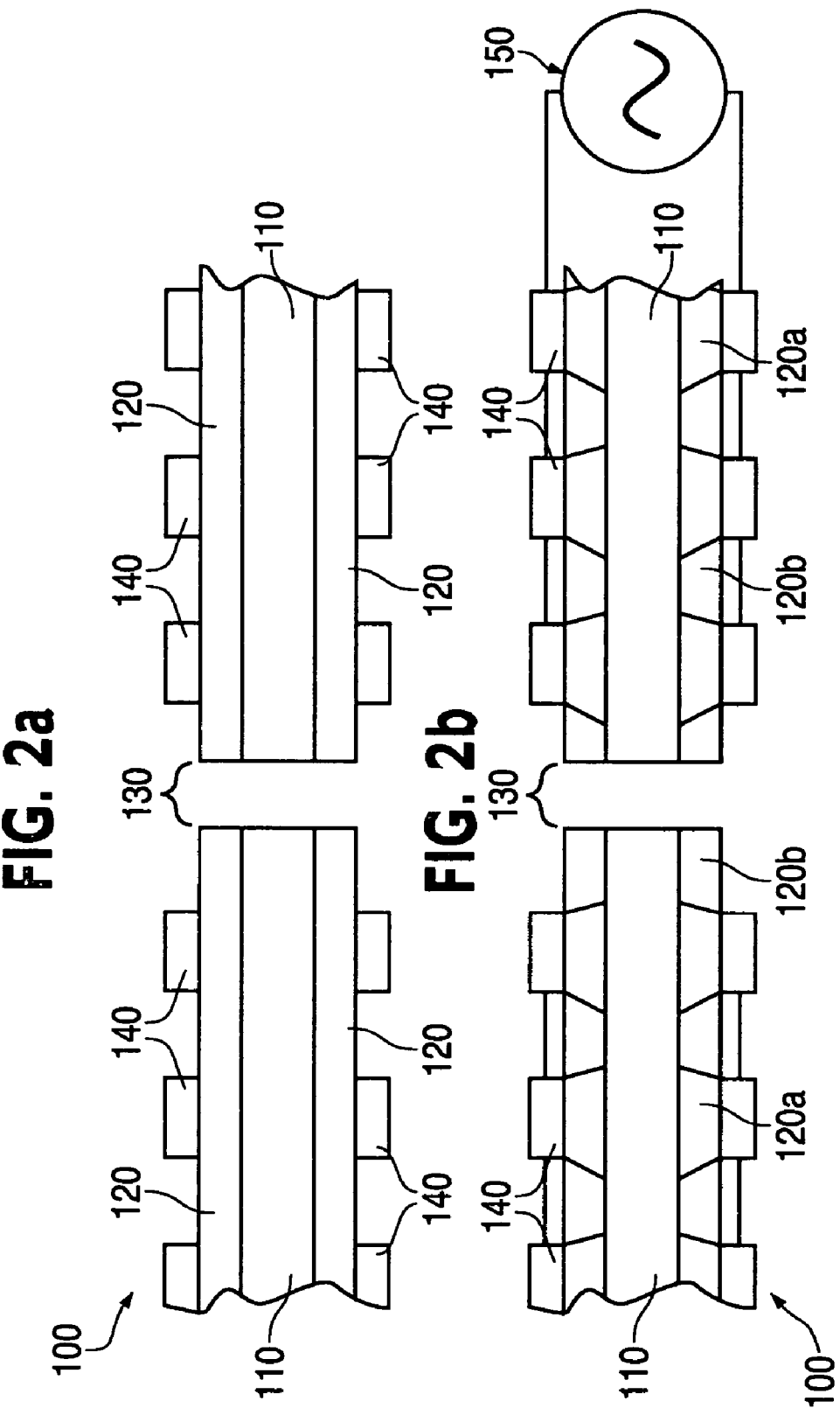

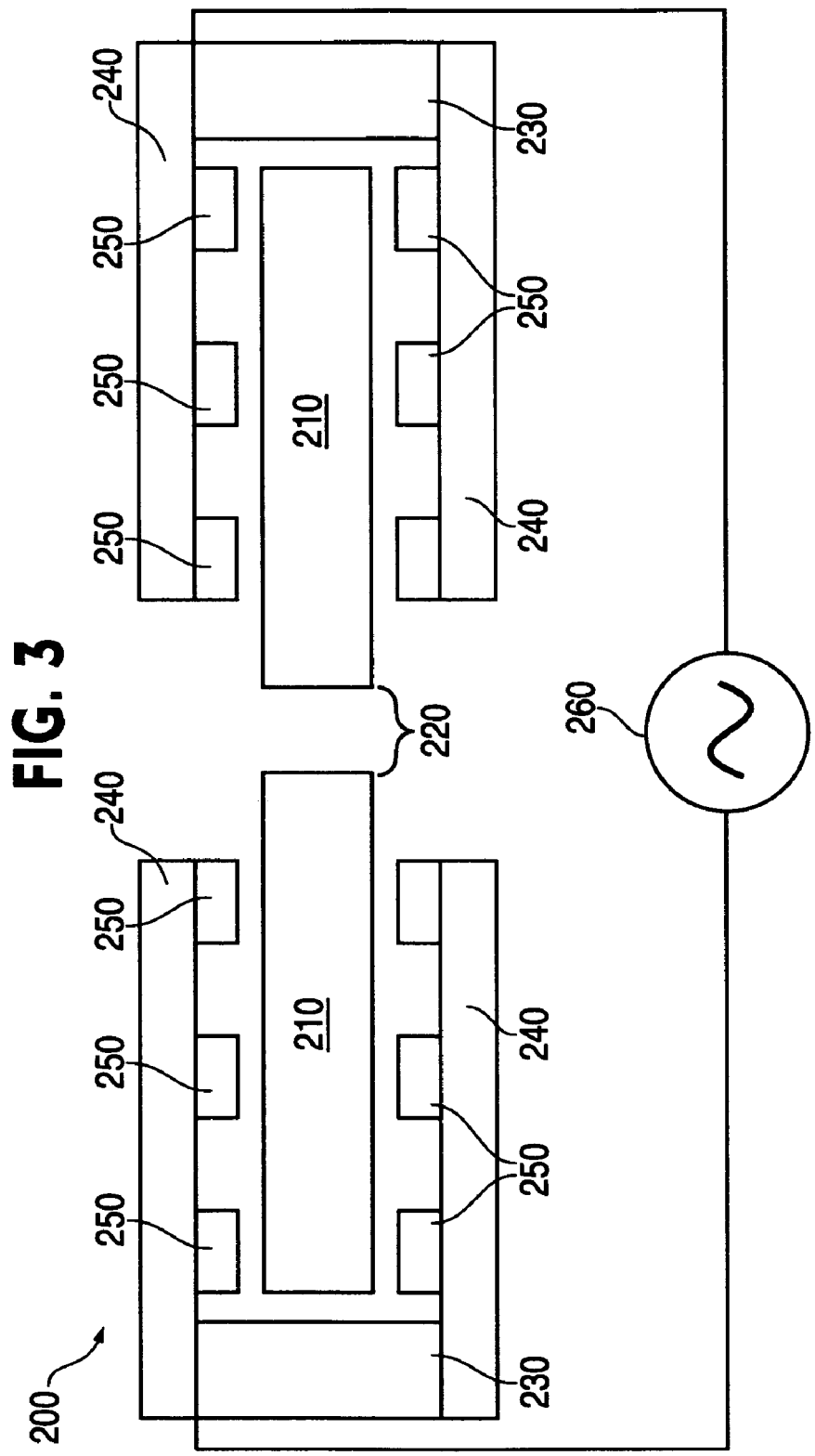

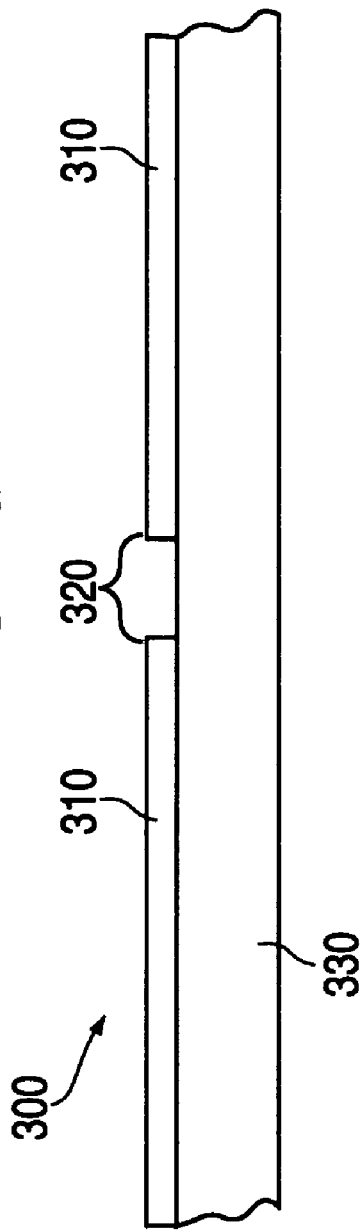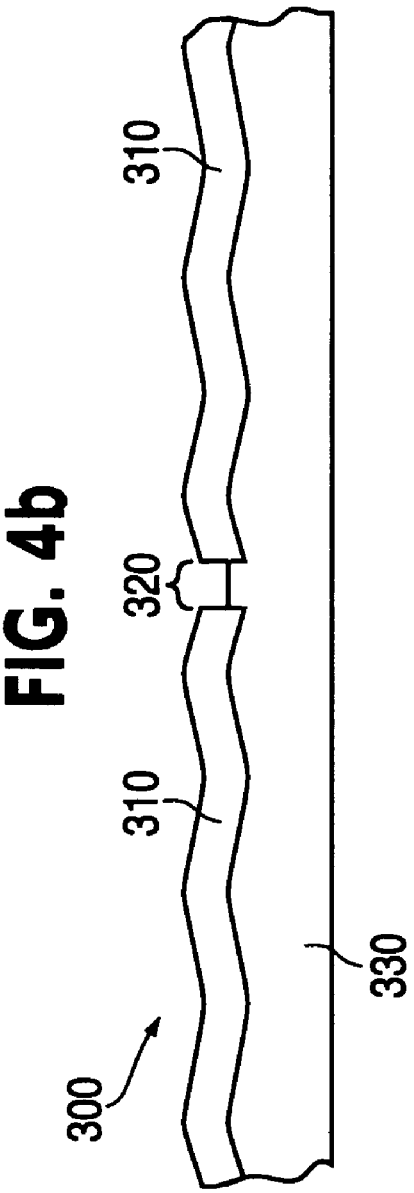

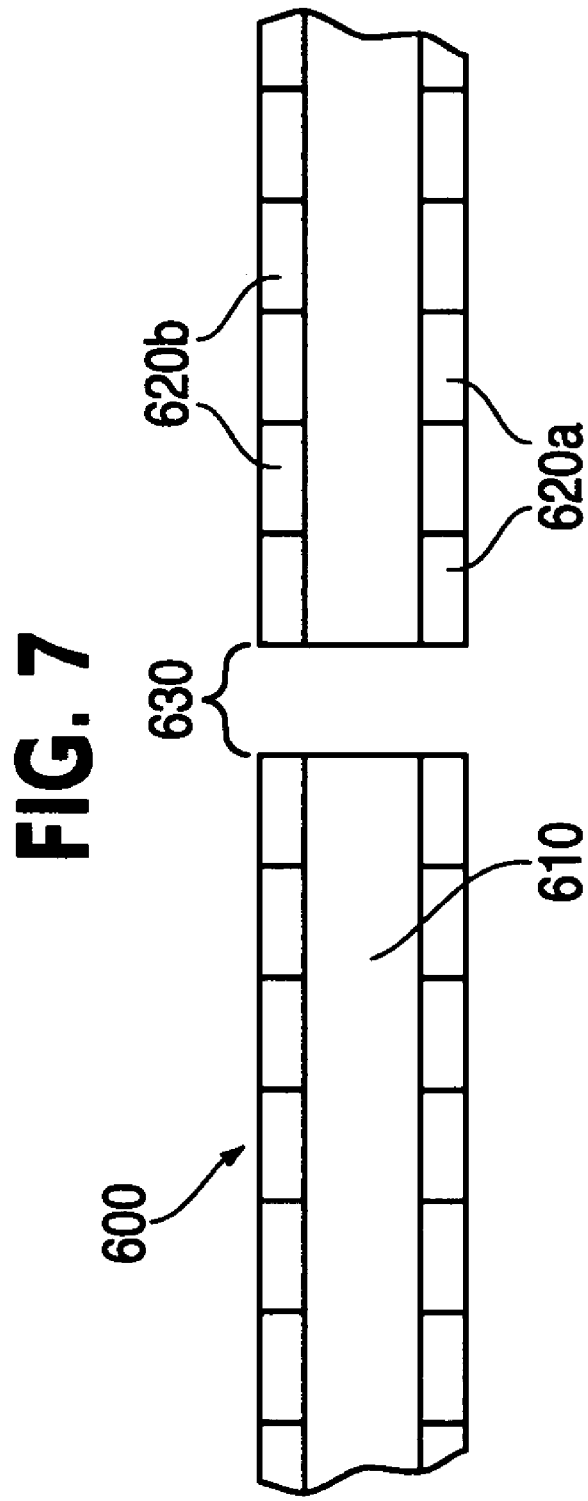

OPTICAL TRANSISTOR WITH SUB-WAVELENGTH APERTURE

FIELD OF THE INVENTION

The present invention relates to optical transistors, and in particular, optical transistors with one or more sub-wavelength apertures and the dynamic control of light propagation through such sub-wavelength apertures.

BACKGROUND OF THE INVENTION

Plasmons are electron charge density waves (ie. oscillations of free (conduction) electrons) that are confined to the surface of a conductor and are generated when photons of light, usually in the visible and infrared regions, strike a conductor such as a thin conducting metal film. For plasmons to be generated, the photons that impinge upon the conducting material cannot simply be reflected by the conducting material, but rather, a significant portion of the photons must be absorbed so that energy and momentum from the incident photons are transformed into surface plasmons. This absorption of photonic energy by a conducting material is referred to in the art as coupling. The more extensive the coupling, the more substantial will be the generation of plasmons.

It is known that coupling between photons and a smooth conductive surface is somewhat weak. The weak coupling is caused by the inability to satisfy both energy and momentum conservation when inter-converting between photons and surface plasmons. It is further known that exposing the photons to some form of periodic perturbation on the surface of the conducting material increases the degree of coupling. This elevated degree of coupling results from satisfying energy and momentum conservation by perturbing the electromagnetic environment at the surface. In many instances, such perturbations are produced by etching the surface of the conducting material. While virtually any etching pattern can be used, two of the more common patterns are concentric circles around a circular aperture, and long narrow ridges beside a longitudinal aperture. The spacing, width and depth of the etchings control the propagation of the plasmons through a sub-wavelength aperture since, it has been theorized, the etchings act as directional antennas by first coupling photons to the aperture and then re-radiating them in a narrow beam through the aperture.

The speed at which plasmons propagate through a conductor is less than the speed of the light that impinged upon the conductor and generated the plasmons. However, while the velocities of the light and plasmons differ, the frequencies of the light and the plasmons generated by that light are equal. Consequently, since $\lambda = \upsilon/f$, the wavelength of the plasmons are appreciably shorter (on the order of a factor of $10^3$) than the wavelength of the light that caused the generation of the plasmons. For an aperture having a diameter less than the wavelength of the incident light, transmission of the light through the aperture is rather limited. In fact, it is proportional to the fourth power of the aperture diameter and the optical wavelength, i.e. transmission $\sim (d/\lambda)^4$. However, light of longer wavelength that could not propagate through a sub-wavelength aperture, when converted into plasmons of shorter wavelength, can propagate through the sub-wavelength aperture. That is, the sub-wavelength aperture essentially functions as a light valve since it permits the propagation of plasmons but not the light that generated those plasmons.

SUMMARY OF THE PREFERRED EMBODIMENTS OF THE INVENTION

In one or more embodiments, the present invention is an optical switch having one or more sub-wavelength apertures. The switch may be activated by applying a signal to the switch, which causes the formation of periodic perturbations. Another way of activating such a switch is to direct a standing wave onto the switch, which also causes the formation of periodic perturbations. A third way to create periodic perturbations and hence activate the switch would be to apply a magnetic field of different strengths to the switch. These perturbations arise from variations in conductance, variations in refractive index, variations in magnetic permeability, and/or variations in the surface of the conductor of the switch. When photons impinge upon the activated switch, a greater amount of light propagates through the sub-wavelength apertures as compared to the amount of light that propagates through the sub-wavelength apertures of an unactivated switch.

It is therefore an object of a preferred embodiment of the present invention to dynamically control the propagation of light through a sub-wavelength aperture in an optical switch.

BRIEF DESCRIPTION OF THE DRAWINGS

FIGS. 2a and 2b are diagrams of optical switches, in an "off" state and an "on" state respectively, that may be used to induce refractive index perturbations in connection with one or more embodiments of the present invention.

FIG. 3 is a diagram of an optical switch that may be used to induce capacitance perturbations in connection with one or more embodiments of the present invention.

FIGS. 4a and 4b are diagrams of optical switches that may be used to induce conducting surface perturbations in connection with one or more embodiments of the present invention.

FIG. 7 is a diagram of an optical switch that may be used to induce magnetic permeability perturbations in connection with one or more embodiments of the present invention.

DETAILED DESCRIPTION OF THE PREFERRED EMBODIMENTS, INCLUDING THE BEST MODE

The preferred embodiments of the present invention involve the dynamic control of light propagation through a sub-wavelength aperture in an optical switch. The dynamic control can be achieved by altering the conductivity in the switch, altering the refractive index in the switch, altering the shape of the conducting surface, and/or altering the magnetic permeability of the switch.

Figure 1A:
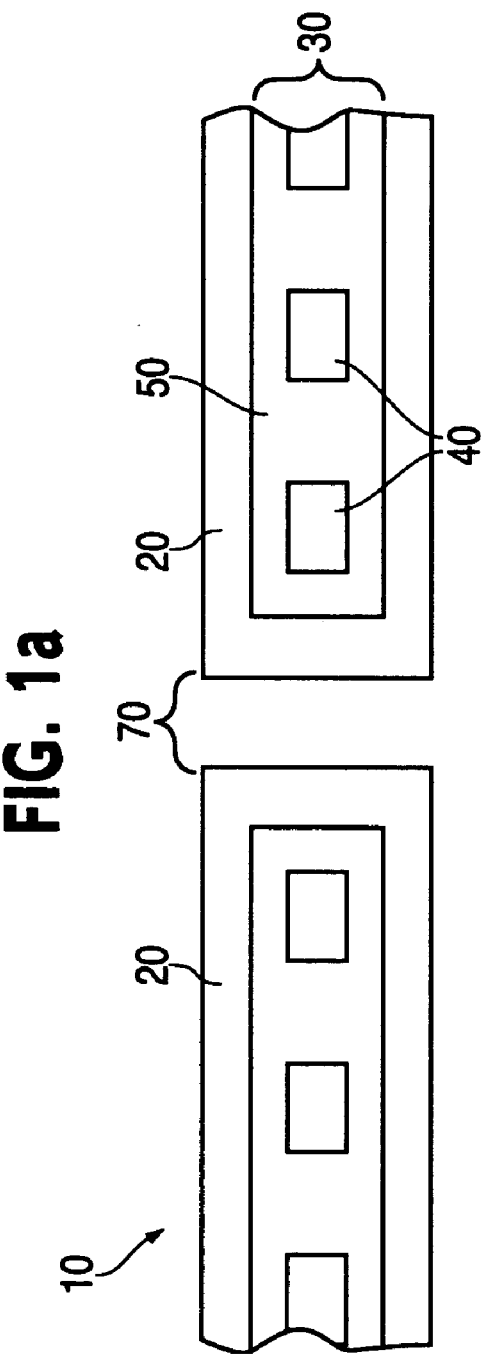
FIGS. 1a and 1b are diagrams of optical switches, in an "off" state and an "on" state respectively, that may be used to induce conductivity perturbations in connection with one or more embodiments of the present invention.
Figure 1B:
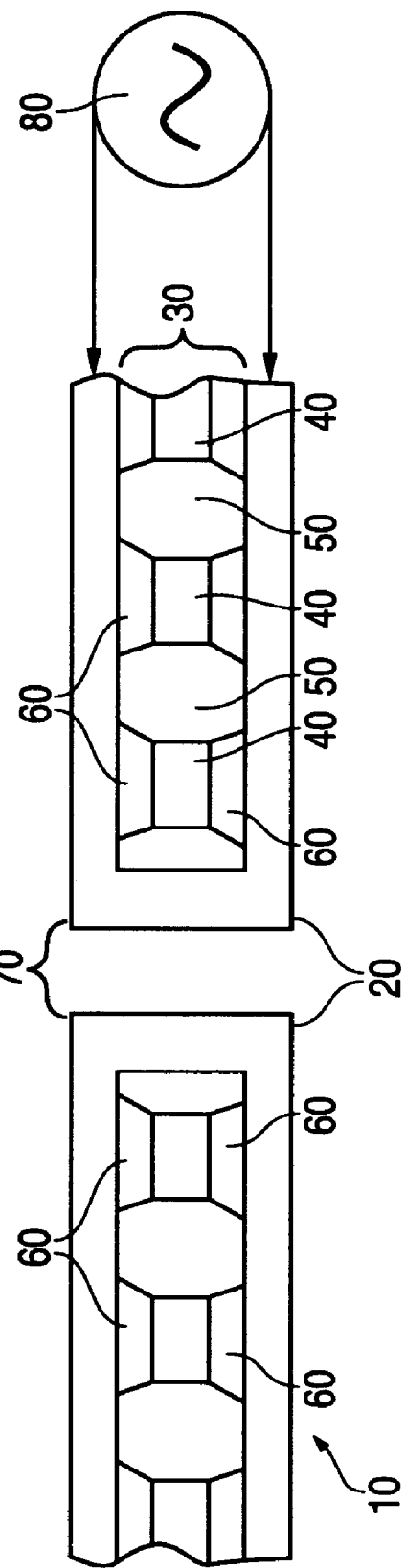

An embodiment of the present invention that provides for the propagation of light through a sub-wavelength aperture in an optical switch by altering the conductivity in the switch is illustrated in FIGS. 1a and 1b. FIG. 1a shows an optical transistor 10 having an outer conductive film 20. The transistor 10 in FIG. 1a is in the "off" state, i.e. a signal has not been applied to the transistor. The conductive film 20 is made out of any good conducting material, such as copper, silver, aluminum or gold, and encloses a channel 30. The channel 30 has within it N/P type semiconductor junctions 40 and/or P/N type semiconductor junctions 50. A sub-wavelength aperture 70 is etched into the transistor 10, and connects a top side of the transistor with a bottom side of the transistor.

In FIG. 1b, the transistor 10 is activated by sending a signal 80 (preferably a reverse bias signal) to the transistor. The signal 80 causes the formation of depletion layers 60 within the channel 30. The depletion layers 60 have reduced conductivity compared to the N/P and/or P/N junctions 40 and 50. With the proper choice of thickness of the conductive film 20, and the proper doping of the channel 30, the depletion layers 60 will extend from within the channel 30 to the interface with the conductive film 20. Moreover, the channel 30 is doped such that the N/P junctions 40, the P/N junctions 50, and the depletion layers 60 form patterns of periodic perturbations when the transistor 10 is activated by a signal. These perturbations are periodic in nature, and they are dynamically activated by supplying the signal 80 to the transistor 10, and dynamically deactivated by cutting off that signal to the transistor 10.

When photons are directed toward and impinge upon the conductive film 20 of an activated transistor 10, a greater amount of light propagates through the sub-wavelength aperture 70 compared to a sub-wavelength aperture in a transistor that has not been activated. While not being bound by theory, it is believed that when photons impinge upon the conductive film 20 of an unactivated transistor, most of the photons are reflected by the film, but some energy and momentum is transferred to the electrons in the film. The movement of the electrons in the film produces an electric field that penetrates into the channel 30, and in particular, the depletion layers 60, the N/P junctions 40, and/or the P/N junction 50. Because of the differences in conductivity of the semiconductor junctions 40 and 50, and the depletion layers 60, the N/P junctions 40, the P/N junctions 50, and the depletion layers 60 form a periodic pattern. This pattern is dictated in the first instance by the pattern of doping of the channel 30, and causes perturbations in the electric field. These patterns of periodic perturbation can be in the shape of concentric circles for sub-wavelength apertures that are circular in shape, in the shape of parallel lines for apertures that are longitudinally shaped, or other patterns now familiar in the art, or later developed by those of skill in the art, to be conducive to the propagation of light through the apertures. The perturbations experienced by the electric field are coupled, or fed back, to the conductive film layer 20. Since the conductive film layer 20 is rather thin, the coupled perturbations propagate to the surface of the conductive film, where they disturb the electromagnetic environment at the surface of the conductive film. The disturbance of the electromagnetic environment at the surface of the conductive film results in a decrease in the reflectivity of the conductive film, and an increase in the absorption of photons and the conversion of the energy and momentum of the photons to plasmons. The generated plasmons propagate through the conductive film 20, and because the wavelength of such generated plasmons is appreciably shorter than the wavelength of the incident photons, also propagate through any sub-wavelength aperture that the plasmons encounter.

FIGS. 2a and 2b illustrate another embodiment of the present invention. FIG. 2a illustrates an optical switch 100 in the "off" state. The switch 100 has a conducting core 110, and an active optical coating 120 disposed on one or both sides of the core 110. The core 110 can be any conducting material such as copper, aluminum, silver, gold, or an alloy. Examples of active optical coatings include lithium niobinate and titanium crystals. The switch 100 also has disposed in it one or more sub-wavelength apertures 130. Terminals 140 are spaced along the length of the active optical coating. The terminals 140 may be made of any conductive material, but it is preferred that the terminals be transparent like the optical coating 120.

The switch 100 is activated by supplying an electrical signal 150 to the terminals 140. FIG. 2b. The terminals 140 are shown connected in series, but they also could be connected in parallel, or multiple wave generators could be connected to one or more terminals. The signal induces a change in the refractive index of the optical coating at 120a that is in contact with the terminal, and the portion of the optical coating 120b that is not in contact with the terminal does not have its refractive index altered. As can be seen from FIG. 2b, with the proper spacing of terminals on the surface of the optical coating, alternating segments with different refractive indices are created, and serve as periodic indices of refractive perturbation.

When photons are directed toward the switch 100, photons pass through the transparent terminals 140, through the transparent optical coating 120, and impinge upon the conducting core 110. When such photons are directed toward an activated switch 100 with its associated refractive index periodic perturbations, a greater amount of light propagates through the sub-wavelength aperture 130 compared to the amount of light that propagates through the sub-wavelength apertures of unactivated optical switches without the periodic perturbations. While not to be bound by theory, it is believed that the energy and momentum from the photons excite the electrons in the conducting core 110. The movement of the electrons produces an electric field that penetrates into the optical coating 120. The electric field is disturbed by the refractive index perturbations, and this disturbance is coupled to the conducting core 110, and in particular, the surface of the conducting core 110 where it interfaces with optical coating 120. The disturbance in the electric field alters the electromagnetic environment at the surface of the core 110, causing fewer photons to be reflected and more photons to be absorbed. The energy and momentum of the absorbed photons are then converted into plasmons. The plasmons propagate through the conductor core 110, and encounter the sub-wavelength apertures 130 through which the plasmons propagate.

In some embodiments, there is some degree of residual perturbations in an unactivated switch that causes some degree of conversion between photons and plasmons. For example, in the just described embodiment of FIG. 2, just the presence of the terminals 140 on the switch causes periodic perturbations even in an unactivated switch. However, such perturbations, if they are present, are not extensive, and while there is some propagation of light through a sub-wavelength aperture in such a case, the activation of the switch causes an appreciable increase in propagation of light through the sub-wavelength apertures.

FIG. 3 illustrates another embodiment of the present invention. An optical switch 200 has within it a conductor 210. The conductor 210 can be any conducting material, such as a thin metallic film. The conductor 210 has disposed within it one or more sub-wavelength apertures 220. Placed in proximity to the conductor 210 is a mechanical actuator 230. Two examples of mechanical actuators that can be used in connection with this embodiment are piezoelectric actuators and magnetostrictive actuators. The actuator 230 has connected to it one or more arms 240 that are in proximity to a top portion and a bottom portion of the conductor 210. Attached to the arms 240 are one or more periodic spatial electromagnetic perturbations 250. The perturbations 250 are positioned between the arm 240 and the conductor 210, and are coated with a conducting material. The conductor of the perturbations 250 and the conductor 210 function as opposing plates of a capacitor. A signal generator 260 supplies a signal to the actuator 230 to activate the transistor 200. When a signal is sent from the signal generator 260 to the actuator 230, the shape and length of the actuator is altered, and the distance between the perturbations 250 and the conductor 210 changes, thereby changing the capacitance.

When photons are directed toward and impinge upon the conductor 210 of an activated transistor 200, a greater amount of light propagates through the sub-wavelength apertures 220 compared to the amount of light that propagates through sub-wavelength apertures in a transistor that has not been activated. While not being bound by theory, it is believed that when photons impinge upon the activated transistor, electrons in the conductor are excited, and the movement of these electrons generates an electric field that disperses into the region of the perturbations 250. The capacitance change caused by the movement of the perturbations 250 affects the strength of the electric field (compared with the strength of an electric field in the presence of a different capacitance in an unactivated switch). This difference in electric field strength causes a difference in the electrical impedance at the surface of the conductor 210. The changed electromagnetic characteristics of the conductor 210 reduce the reflectivity of the conductor, allowing more photons to be absorbed. The absorption allows coupling of a photon's energy and momentum, and the subsequent formation of plasmons. The plasmons propagate through the conductor, and propagate through a sub-wavelength aperture when one is encountered.

FIGS. 4a and 4b illustrate another embodiment of the present invention. A switch 300 has a conductor 310 that can be manufactured out of any conducting material, and which has imbedded in it one or more sub-wavelength apertures 320. The conductor 310 is placed onto a substrate 330. The substrate 330 may be a transparent crystal or other clear substrate. In this embodiment, the switch 300 is activated by applying an acoustic wave to the switch. Such an acoustic wave may include a bulk acoustic standing wave or a surface acoustic wave. In FIG. 4a, the switch 300 is not activated, i.e. an acoustic wave has not been applied to the switch 300. In FIG. 4b, the switch 300 is activated, i.e. an acoustic wave has been applied to the switch 300. The physical impact of the acoustic wave on the substrate 330 deforms the substrate 330, and since the conductive film is deposited on the substrate 330, the conductive film is deformed also.

When the optical switch 300 is not activated as shown in FIG. 4a, very little if any light propagates through the sub-wavelength apertures. However, when the switch 300 is activated by applying an acoustic wave to the switch, a greater amount of light propagates through the sub-wavelength apertures. While not being bound by theory, it is believed that when the switch is activated, periodic perturbations are formed by the deformation of the substrate 330 and the conductor 310 by the acoustic wave. When photons impinge upon the conductor surface of an activated switch 300, the periodic perturbations create a disturbance or scattering of the photons, whereby more of the photonic energy and momentum are absorbed by the conductor. The absorbed energy and momentum are coupled to generate plasmons, which propagate through the conductor and through the sub-wavelength apertures.

Figure 5:
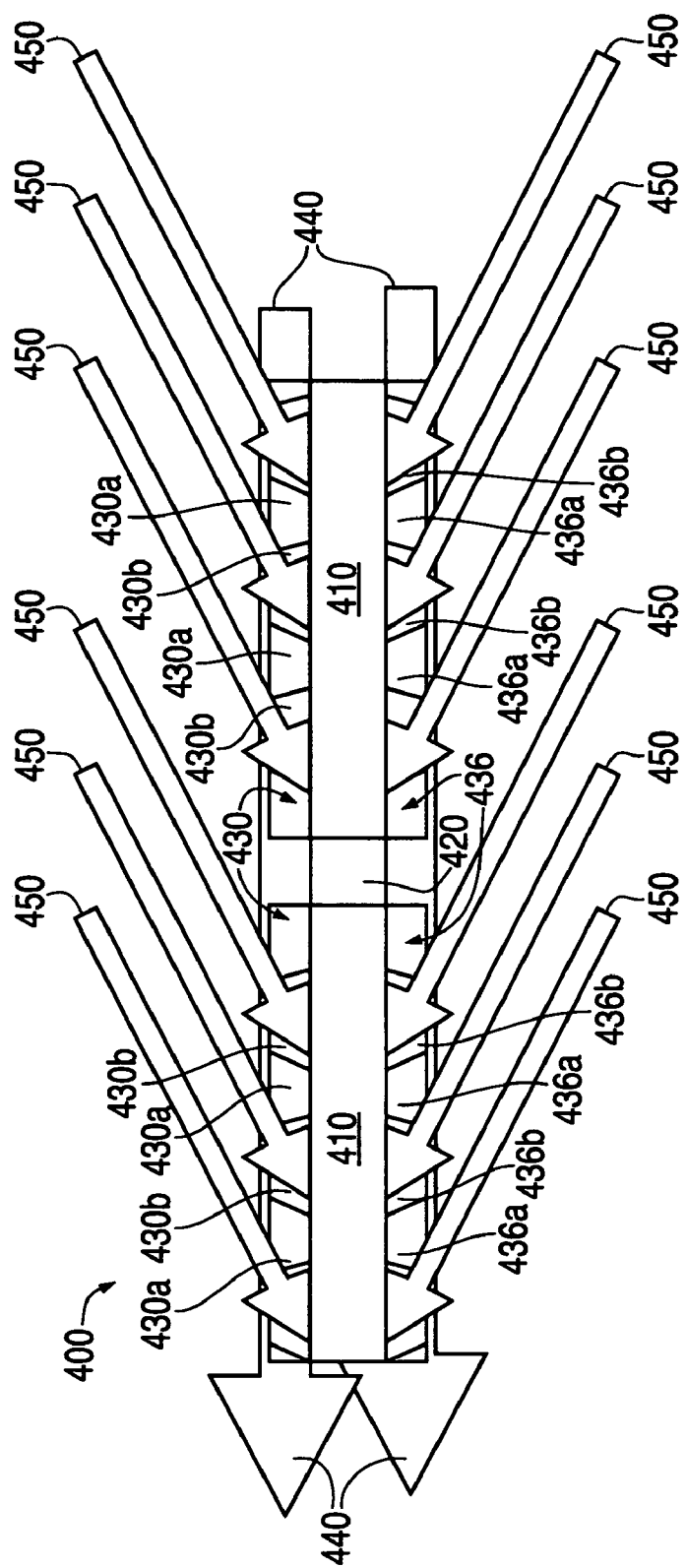
FIG. 5 is a diagram of an optical switch that may be used to induce refractive index perturbations in connection with one or more embodiments of the present invention.

Another embodiment of the present invention is illustrated in FIG. 5 as viewed from the side. A switch 400 has a conducting membrane 410, and one or more sub-wavelength apertures 420. Attached to one or both sides of the membrane 410 are two strongly non-linear, transparent crystals 430 and 436. When photons impinge upon the switch 400, very little light propagates through the sub-wavelength apertures. However, the propagation of light through the sub-wavelength aperture can be increased by establishing an optical standing wave 440 (or pump beam) on the crystal 430. The pump beam can be made up of light beams of one or more intensities. Each intensity, upon striking the crystal 430 and 436, creates period refractive index variations in the crystal 430 and 436, respectively. The low refractive index regions 430a and high refractive index regions 430b of crystal 430 produce a period perturbation in the electromagnetic environment for the top of the membrane 410. Similarly, the low refractive index regions 436a and high refractive index regions 436b of crystal 436 produce a period perturbation in the electromagnetic environment for the bottom of the membrane 410. In the case of a pump beam that is made up of only one intensity, that intensity creates a different refractive index than the refractive index of that portion of the crystal that is not impacted with the pump beam. These different refractive indices create periodic perturbations. A second beam 450, referred to as a write beam, is then directed onto the switch 400. The write beam 450 penetrates the crystal 430, and impinges on the conducting membrane 410. While FIG. 5 shows a particular pattern of pump and write beams, other patterns could be used to create the periodic perturbations. A greater amount of light propagates through the sub-wavelength apertures in the presence of the pump beam 440 than without it.

While not being bound by theory, it is believed that the write beam impinges upon the conducting membrane 410, and excites the electrons in the conductor. The movement of the electrons generates an electric field, which penetrates into the crystal 430. The periodic perturbations caused by the refractive index striations disturb the electric field, and this disturbance couples to the surface of the conducting membrane 410. This alters the electromagnetic environment of the conducting surface, which reduces its reflectivity, which in turn causes an increased amount of photonic energy and momentum to be absorbed, and a greater amount of plasmons is formed. The plasmons propagate through the conductor 410, and propagate through the sub-wavelength apertures 420.

In addition to the proposed mechanism just described for the embodiment of FIG. 5, there are two other mechanisms that may be involved. First, charges may accumulate at the peaks of the standing wave 440. The forces exerted by those charges will alter the refractive index in the crystal 430, thereby creating periodic perturbations that are dictated by the distances between the peaks. Second, the pump beam 440 causes the excitation of molecules to a higher energy state, followed by a decaying to a lower energy state (but not back down to the ground state). At some point in time, either no or an insignificant number of molecules will remain at the original energy level (the ground state). The crystal 430 will then no longer absorb light, and will become transparent. The refractive index of the crystal will change, for particular frequencies of light, in the vicinity of the conductor. These changes in refractive indices form periodic perturbations in the switch, and increase the amount of light propagated through sub-wavelength apertures in the switch.

Figure 6A:
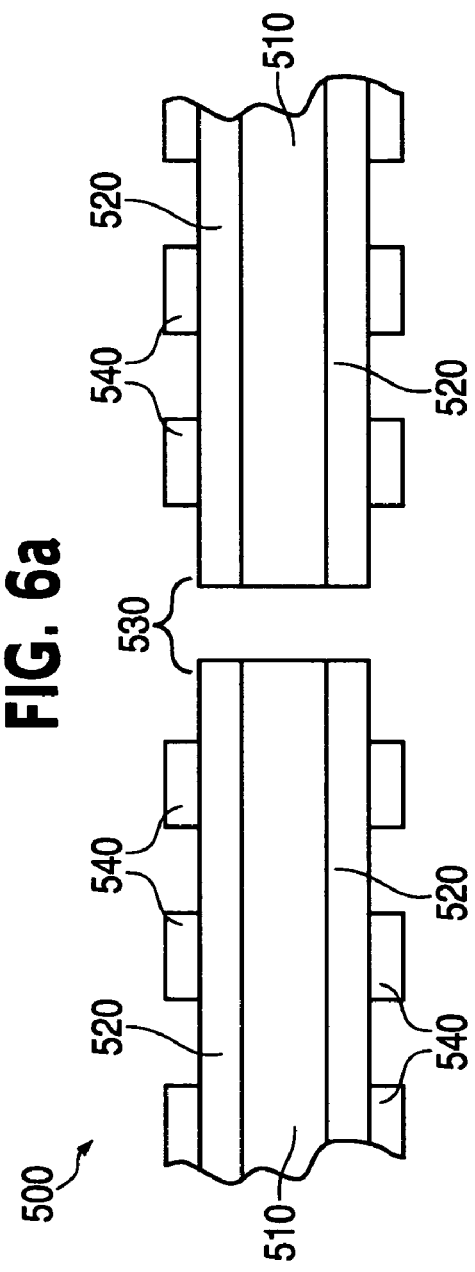
FIG. 6 is a diagram of an optical switch that may be used to induce magnetic permeability perturbations in connection with one or more embodiments of the present invention.
Figure 6B:
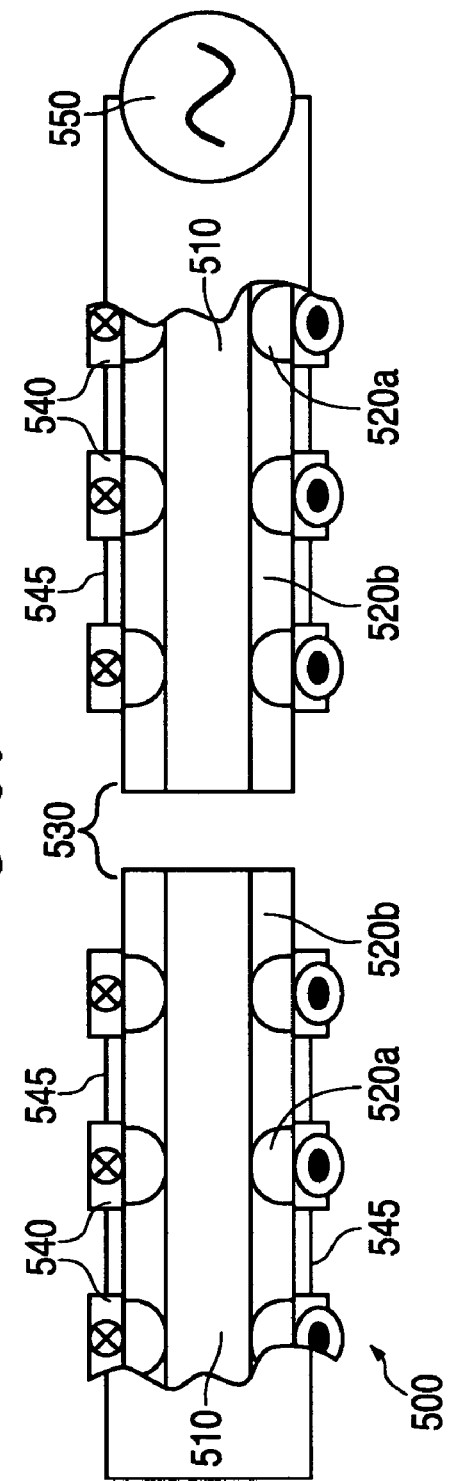

FIGS. 6a and 6b illustrate another embodiment of the present invention. An optical switch 500 has a conductor 510. Deposited on the conductor 510 is a transparent ferromagnetic material 520. Placed at various points along the surface of the ferromagnetic material 520 are terminals 540, which are connected to each other by wires 545. (FIG. 6b). A signal source 550 is connected to the terminals 540, and supplies a signal to the terminals 540. The applied signal causes a current to run through the terminals, thereby creating a magnetic field in the vicinity of the terminals. The switch 500 has one or more sub-wavelength apertures 530.

In the embodiment of FIGS. 6a and 6b, when a current runs through the terminals 540, more light propagates through the sub-wavelength apertures 540 than when no current runs through the terminals. While not being bound by theory, it is believed that the magnetic field produced by the current flow changes the permeability of the ferromagnetic material 520 that is in the immediate vicinity of the terminals 540. In FIG. 6b, this change in permeability occurs at 520a. The portion of the ferromagnetic material that does not go through a permeability change is indicated by 520b. The permeability of the ferromagnetic material 520 is measured by the ratio of the strength of the magnetic field to the current level. The alternating pattern of permeabilities forms a pattern of periodic perturbations. When a beam of light impinges upon the switch 500, the light penetrates the transparent ferromagnetic material 520, and strikes the conducting material 510. The light excites the electrons in the conductor 510. The movement of the electrons generates an electric field, which penetrates into the ferromagnetic material 520. The periodic perturbations disturb the electric field, and this disturbance couples to the surface of the conducting material 510. This alters the electromagnetic environment of the conducting surface, which reduces its reflectivity, which in turn causes an increased amount of photonic energy and momentum to be absorbed, and a greater number of plasmons is formed. The plasmons propagate through the conductor 510, and propagate through the sub-wavelength apertures 530.

Another embodiment of the invention is illustrated in FIG. 7. In FIG. 7, an optic switch 600 has a conductor core 610. The core 610 is coated, in alternating fashion, with transparent non-ferromagnetic material 620a and transparent ferromagnetic material 620b. The switch 600 has one or more sub-wavelength apertures 630. When a magnetic field is applied to the switch 600, the permeability of the ferromagnetic material 620b is reduced (due to the non-linearity of the ferromagnetic material), causing the permeabilities of the ferromagnetic material 620b to significantly decrease. When the magnetic field is removed, the permeability of the ferromagnetic material 620b increases. That is, it is an inverse relationship, the permeability of the ferromagnetic material 620b decreases as the strength of the magnetic field increases.

When light impinges on a switch 600 which does not have a magnetic field applied to it, more light propagates through the sub-wavelength aperture 630 than when a magnetic field is applied to the switch. While not being bound by theory, it is believed that when light strikes a switch that does not have a magnetic field applied to it, the light passes through the transparent non-ferromagnetic material 620a and the ferromagnetic material 620b and strikes the conductor core 610. The energy from the photons of light excite the electrons in the core 610, and the electric field created by the movement of these electrons generates a magnetic field that penetrates into the coating layer of ferromagnetic material 620b and non-ferromagnetic material 620a. When no magnetic field is applied to the switch 600, the permeabilities of the ferromagnetic material 620b is relatively large, and forms periodic perturbations in the transparent materials 620a and 620b. The magnetic field is disturbed by these perturbations, and the disturbance couples to the conductor 610. This alters the electromagnetic environment around the surface of the conductor, which reduces the reflectivity of the conductor, and causes more photons to be absorbed. The increased absorption of photons results in an increase in the conversion of photons to plasmons, with a concomitant increase in the amount of light that propagates through the sub-wavelength apertures 630.

While the invention has been described in its preferred and other embodiments, it is to be understood that the words used are words of description rather than limitation and that changes may be made within the purview of the appended claims without departing from the true scope and spirit of the invention in its broader aspects.

The invention claimed is:

1. An optical switch comprising:
   a conductor;
   one or more sub-wavelength apertures; and
   means to dynamically alter an electromagnetic environment in proximity to a surface of said conductor by one or more of an electrical signal, a standing wave, and a magnetic field;
   wherein upon alteration of said electromagnetic environment in proximity to said surface of said conductor, periodic perturbations are formed in proximity to said surface of said conductor.

2. The optical switch according to claim 1, wherein photons impinge upon said surface of said conductor, and light propagates through said one or more sub-wavelength apertures.

3. The optical switch according to claim 2, wherein plasmons are formed in proximity to said conductor.

4. The optical switch according to claim 3, wherein said plasmons propagate from a first side of said switch, through said one or more sub-wavelength apertures, to a second side of said switch.

5. The optical switch according to claim 1,
   wherein said conductor encloses a channel; and
   further wherein said channel comprises a P/N junction.

6. The optical switch according to claim 1,
   wherein photons of light impinge upon said switch;
   and further wherein said light propagates through said one or more sub-wavelength apertures.

7. The optical switch according to claim 6,
   wherein said photons, upon impinging said switch, are converted into plasmons;
   and further wherein said plasmons propagate through said one or more sub-wavelength apertures.

8. The optical switch according to claim 1, further comprising:
   an optical coating on one or more sides of said conductor; and
   one or more terminals positioned on said optical coating;
   wherein said terminals are electrically coupled to a signal source.

9. The optical switch according to claim 8,
   wherein said means to dynamically alter an electromagnetic environment comprise activating said optical switch by applying a signal to said terminals;
   and further wherein said periodic perturbations comprise different refractive indices in said optical coating.

10. The optical switch according to claim 9,
wherein photons of light impinge on said switch;
and further wherein light propagates through said one or more sub-wavelength apertures.

11. The optical switch according to claim 10,
wherein said photons of light cause the formation of plasmons;
and further wherein said plasmons propagate through said one or more sub-wavelength apertures.

12. The optical switch according to claim 8, wherein said terminals and said optical coating are transparent.

13. The optical switch according to claim 1,
wherein said means to dynamically alter an electromagnetic environment comprise an actuator and periodic spatial electromagnetic perturbations, said periodic spatial electromagnetic perturbations comprising a conductive coating; and
further comprising means to connect said actuator to said periodic spatial electromagnetic perturbations.

14. The optical switch according to claim 13,
wherein a signal is applied to said actuator, causing said actuator to change in size and shape;
and further wherein said change in size and shape of said actuator causes a change in distance between said conductor and said conductive coating of said periodic spatial electromagnetic perturbations, thereby causing a change in capacitance between said conductor and said periodic spatial electromagnetic perturbations, said change in capacitance comprising said periodic perturbations.

15. The optical switch according to claim 14,
wherein photons of light impinge upon said switch;
and further wherein said light propagates through said one or more sub-wavelength apertures.

16. The optical switch according to claim 15,
wherein said photons cause the formation of plasmons; and
further wherein said plasmons propagate through said one or more sub-wavelength apertures.

17. The optical switch according to claim 13, wherein said actuator is a piezoelectric actuator.

18. The optical switch according to claim 13, wherein said actuator is a magnetostrictive actuator.

19. The optical switch according to claim 1,
further comprising a substrate upon which said conductor is disposed.

20. The optical switch according to claim 19,
wherein said substrate is transparent.

21. The optical switch according to claim 19,
wherein said means to dynamically alter an electromagnetic environment comprise an acoustic wave applied to said substrate;
and further wherein said acoustic wave physically alters said substrate and said conductor.

22. The optical switch according to claim 21,
wherein said periodic perturbations comprise said physical alteration of said substrate and said conductor.

23. The optical switch according to claim 21,
wherein photons of light impinge upon said switch;
and further wherein said light propagates through said one or more sub-wavelength apertures.

24. The optical switch according to claim 23,
wherein said photons cause the formation of plasmons;
and further wherein said plasmons propagate through said one or more sub-wavelength apertures.

25. The optical switch according to claim 1, further comprising:
an optical coating on said conductor; and
a standing pump beam impinging upon said switch;
wherein said pump beam comprises one or more intensities of light;
and wherein said one or more intensities of light alter said electromagnetic environment in proximity to said conductor;
and further wherein said one or more intensities of light create different indices of refraction within said optical coating, said different indices of refraction forming said periodic perturbations.

26. The optical switch according to claim 25, further comprising:
a write beam impinging upon said switch.

27. The optical switch according to claim 26,
wherein photons of light from said write beam propagate through said one or more sub-wavelength apertures.

28. The optical switch according to claim 27,
wherein said photons of light from said write beam cause the formation of plasmons; and
further wherein said plasmons propagate through said one or more sub-wavelength apertures.

29. The optical switch according to claim 1, further comprising:
a ferromagnetic coating on one or more sides of said conductor; and
one or more terminals positioned on said ferromagnetic coating;
wherein said terminals are electrically coupled to a signal source.

30. The optical switch according to claim 29,
wherein said means to dynamically alter an electromagnetic environment comprise activating said optical switch by applying a signal to said terminals, thereby causing a current to run through said one or more terminals;
and further wherein said current creates a magnetic field in proximity of said terminals;
and further wherein said periodic perturbations comprise different permeabilities caused by said magnetic field.

31. The optical switch according to claim 30,
wherein photons of light impinge on said switch;
and further wherein light propagates through said one or more sub-wavelength apertures.

32. The optical switch according to claim 3,
wherein said photons of light cause the formation of plasmons;
and further wherein said plasmons propagate through said one or more sub-wavelength apertures.

33. The optical switch according to claim 29, wherein said terminals and said ferromagnetic coating are transparent.

34. The optical switch according to claim 1, further comprising:
a ferromagnetic coating and a non-ferromagnetic coating on one or more sides of said conductor, said ferromagnetic coating and said non-ferromagnetic coating disposed on said conductor in an alternating fashion.

35. The optical switch according to claim 34,
wherein said means to dynamically alter an electromagnetic environment comprise applying a magnetic field to said switch, thereby altering a permeability of said ferromagnetic coating;
and further wherein said periodic perturbations comprise said different permeabilities of said ferromagnetic coating and said non-ferromagnetic coating.

36. The optical switch according to claim 35,
wherein photons of light impinge on said switch;
and further wherein light propagates through said one or more sub-wavelength apertures.

37. The optical switch according to claim 36,
wherein said photons of light cause the formation of plasmons;
and further wherein said plasmons propagate through said one or more sub-wavelength apertures.

38. The optical switch according to claim 34, wherein said ferromagnetic coating and said non-ferromagnetic coating are transparent.

39. A process to increase the amount of light propagated through a sub-wavelength aperture in an optical switch, comprising the steps of:
   providing an optical switch, said optical switch comprising one or more sub-wavelength apertures;
   applying an acoustic wave to said switch, said acoustic wave creating periodic perturbations in said switch; and
   directing photons to impinge upon said switch;
   wherein light from said photons propagate through said sub-wavelength aperture.

40. A process to increase the amount of light propagated through a sub-wavelength aperture in an optical switch, comprising the steps of
   providing an optical switch, said optical switch comprising a conductor, said conductor coated with an optically active coating;
   directing a standing beam to impinge on said optically active coating, said standing beam creating different refractive indices within said optically active coating; and
   directing a write beam to impinge on said optically active coating;
   wherein light from said write beam propagates through said sub-wavelength aperture.

* * * * *